United States Patent
Tanaka et al.

(10) Patent No.: US 8,408,503 B2
(45) Date of Patent: Apr. 2, 2013

(54) STAGE APPARATUS

(75) Inventors: Yasuzo Tanaka, Chigasaki (JP); Junpei Yuyama, Chigasaki (JP); Mitsuru Yahagi, Chigasaki (JP); Hirofumi Minami, Chigasaki (JP); Makoto Takahashi, Hidaka (JP); Shinya Ito, Hidaka (JP)

(73) Assignee: Ulvac, Inc., Chigasaki-shi (JP)

( * ) Notice: Subject to any disclaimer, the term of this patent is extended or adjusted under 35 U.S.C. 154(b) by 273 days.

(21) Appl. No.: 12/712,566

(22) Filed: Feb. 25, 2010

(65) Prior Publication Data

US 2010/0163703 A1   Jul. 1, 2010

Related U.S. Application Data

(63) Continuation of application No. PCT/JP2008/065244, filed on Aug. 27, 2008.

(30) Foreign Application Priority Data

Aug. 28, 2007   (JP) .................................. 2007-221404

(51) Int. Cl.
*A47K 1/04* (2006.01)

(52) U.S. Cl. .................... 248/129; 248/346.06; 248/429

(58) Field of Classification Search .................. 108/102, 108/137; 29/251; 269/47, 71; 248/429, 248/346.06, 129
See application file for complete search history.

(56) References Cited

U.S. PATENT DOCUMENTS

| | | | | |
|---|---|---|---|---|
| 5,432,990 A | * | 7/1995 | Seneff | ............................. 29/251 |
| 6,138,592 A | * | 10/2000 | Seneff | ........................... 112/103 |
| 7,444,945 B2 | * | 11/2008 | Wang | ............................. 108/20 |
| 7,588,255 B2 | * | 9/2009 | Katz | ......................... 280/47.27 |

FOREIGN PATENT DOCUMENTS

| | | |
|---|---|---|
| JP | 7-124831 | 5/1995 |
| JP | 8-335540 | 12/1996 |
| JP | 11-340692 | 12/1999 |
| JP | 2004-172500 A1 | 6/2004 |
| JP | 2007-73688 A1 | 3/2007 |
| JP | 2008-93651 A1 | 4/2008 |

OTHER PUBLICATIONS

International Search Report for International Application No. PCT/JP2008/065244 dated Oct. 24, 2008.
Japanese Office Action mailed Mar. 4, 2012, with English Translation in counterpart JP 2009-530139.

* cited by examiner

*Primary Examiner* — Amy J Sterling
(74) *Attorney, Agent, or Firm* — Kratz, Quintos & Hanson, LLP (57) ABSTRACT

A stage apparatus enables easy position alignment at a real installation site. Mounts 25 having sub base plates 21 arranged thereon are provided on carriages 25 and thereby constitute sub mounting tables 20a to 20d; and the mounts 25 are fixed to a main mounting table 10 having a main base plate 11. The positions of main base plate 11 and sub base plates 21 are aligned with each other by adjustment mechanisms 30 provided on the sub mounting tables 20a to 20d. As main positioning members 16 and sub positioning members 24$_1$, 24$_2$ are arranged on the main mounting table 10 and sub mounting tables 20a to 20d, separation can be performed so that a state of position alignment is restorable. Accordingly, position alignment is easy when assembling after transportation.

4 Claims, 9 Drawing Sheets

STAGE APPARATUS

This application is a continuation of International Application No. PCT/JP2008/065244 filed Aug. 27, 2008, which claims priority to Japan Patent Document No. 2007-221404, filed on Aug. 28, 2007. The entire disclosures of the prior applications are herein incorporated by reference in their entireties.

BACKGROUND

The present invention generally relates to a technical field of stage apparatuses, and more particularly relates to a stage apparatus that can be disassembled.

Figure 9:
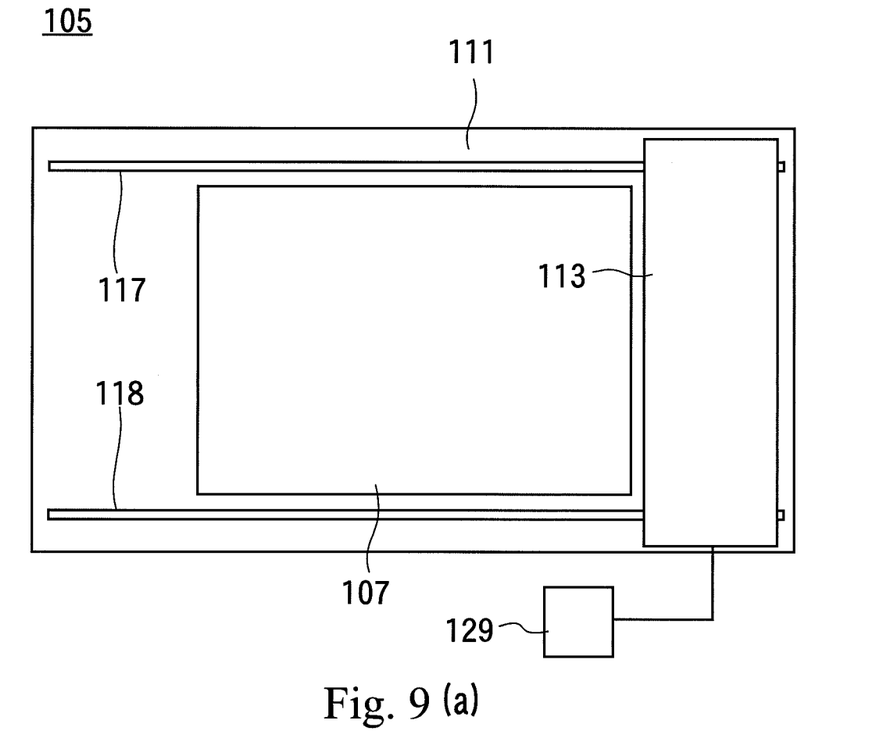
FIG. 9(a) is a plan view (1) of a stage apparatus in a conventional art.
FIG. 9(b) is a side view (1) thereof.

Reference numeral 105 in FIG. 9 represents a stage apparatus of a conventional art.

The stage apparatus 105 includes a base plate 111; and the base plate 111 is mounted on a floor with leg sections 112a to 112d disposed at the four corners on the back surface.

Rails 117 and 118 are arranged on the surface of the base plate 111; and an ejection device 113 is mounted thereon. A print head is disposed on a surface of the ejection device 113 at a position facing the base plate 111. The print head is connected with a tank 129, which supplies ejection liquid to the print head; and when a substrate 107 is mounted on the base plate 111 and ejection liquid is ejected from the print head, the ejection liquid lands on the substrate 107.

Figure 10:
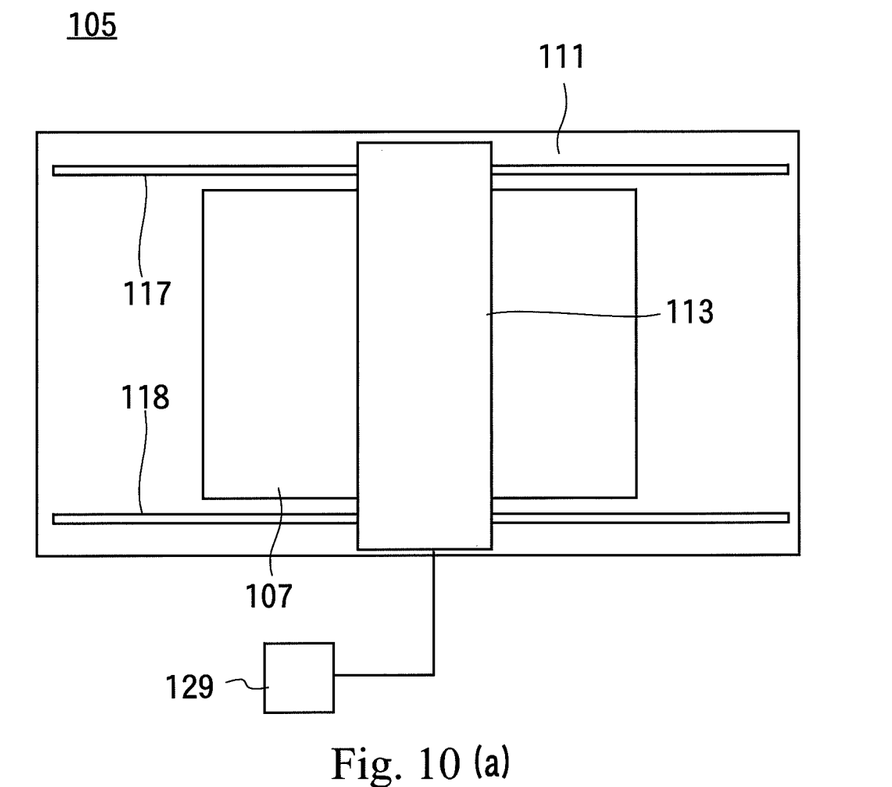
FIG. 10(a) is a plan view (2) of the stage apparatus in the conventional art.
FIG. 10(b) is a side view (2) thereof.

The ejection device 113 is arranged so as to be movable on the rails 117 and 118; and when the ejection device 113 ejects ejection liquid above the substrate 107, as shown in FIG. 10, it is possible to land the ejection liquid on a desired position of the surface of the substrate 107.

This ejection liquid is, for example, a raw material of an organic thin film for a liquid crystal oriented film, spacer dispersion liquid for a liquid crystal display device, raw material of a light emitting layer of an organic EL element, or the like; and the stage apparatus 105 is used to eject ejection liquid onto a large substrate.

However, substrates as an object to be ejected are becoming larger and larger. Consequently, stage apparatuses are becoming larger, which makes it difficult to transport a stage apparatus fabricated at a factory to an installation site because of problems in terms of cost and due to law restrictions.

In such circumstances, countermeasure is taken even in conventional arts as in, for example, JP2007-73688A, and an attempt has been made to transport a base plate by dividing it.

SUMMARY OF THE INVENTION

However, in assembling a once divided base plate at an installation site, a lot of work is required for position alignment or the assembly precision becomes degraded, and thus a solution for these problems is desired.

In order to solve the above-described problems, the present invention is a stage apparatus having a main base plate disposed on a main mounting table and a sub base table disposed on a sub mounting table and smaller than the main base plate, the main base plate and sub base plate being detachably and horizontally connected with each other, the sub mounting table including a carriage having the sub base plate mounted thereon; and an adjustment mechanism that changes a relative position between the carriage and the sub base plate.

Further, the present invention is the stage apparatus, further including a main positioning member arranged at the main mounting table; and a sub positioning member that can be in contact with the main positioning member, and arranged at the sub mounting table, wherein at least one of positional relationship between the main positioning member and main base plate and positional relationship between the sub positioning member and sub base plate is changeable and fixable.

Still further, the present invention is the stage apparatus, wherein the main positioning member and sub positioning member fit to each other to define a position of the sub mounting table with respect to the main mounting table.

Yet further, the present invention is the stage apparatus, wherein the sub positioning member is disposed on the carriage.

Further, the present invention is the stage apparatus, further including a main rail arranged on the main base plate of the main mounting table; and a sub rail coupled with the main rail arranged on the sub base plate of the sub mounting table.

With this invention, accuracy in the position alignment between a main base plate and a sub base plate at a real installation site is improved.

Also, work at the real installation site becomes easy.

DETAILED DESCRIPTION OF THE INVENTION

Reference numeral 5 in FIGS. 5(a) and 5(b) generally represents a stage apparatus of the present invention. FIG. 5(a) is a plan view, and FIG. 5(b) is a side view.

The stage apparatus 5 includes a main mounting table 10 and a plurality of sub mounting tables 20a to 20d.

The main mounting table 10 and sub mounting tables 20a to 20d have a main base plate 11 and sub base plates 21, respectively; and surfaces of the main base plate 11 and sub base plates 21 are flat. The surfaces of the base plate 11 and sub base plates 21 are disposed so as to be horizontal at the same height.

The planar shape of the main base plate 11 is rectangular, and rails 17a and 17b are arranged along two parallel sides of the four sides of the rectangle.

A sub rail 18 is disposed on each sub base plate 21.

Both ends of the main rails 17a and 17b are connected to the ends of the sub rails 18, and two sub rails 18 and the main rail 17a or 17b therebetween form a continuous one rail 19a or 19b.

A movable member (herein, a gantry) is arranged on the rails 19a and 19b, and an ejection device 13 is mounted on the gantry.

A print head (not shown) is provided at the bottom surface portion of the ejection device 13. The ejection device 13 is connected with a tank 29 containing ejection liquid. When the print head is operated while ejection liquid is supplied from the tank 19, the ejection liquid is ejected from the print head.

A substrate 7 is disposed on a portion of the base plate 11 located between the main rails 17a and 17b.

The ejection device 13 is arranged so as to be able to run on the rails 19a and 19b. As shown in FIGS. 6(a) and 6(b), when ejection liquid is ejected from the print head in a state such that the ejection device 13 is located above the substrate 7, the ejection liquid lands on the surface of the substrate 7. By moving the ejection device 13, it is possible to land ejection liquid on a desired position of the surface of the substrate 7.

Figure 5:
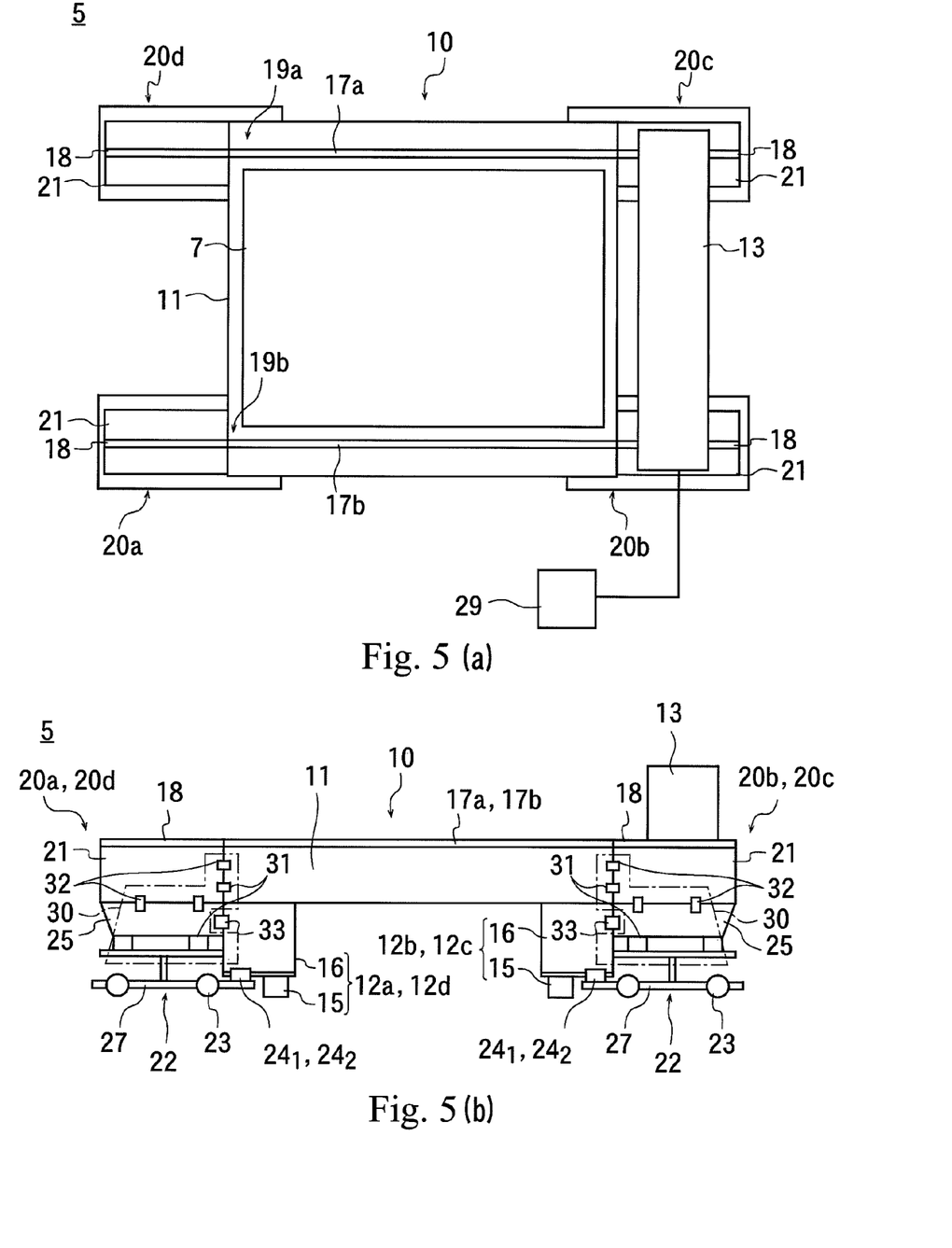
FIG. 5(a) is a plan view of an example of a stage apparatus of the present invention.
FIG. 5(b) is a side view thereof.
Figure 6:
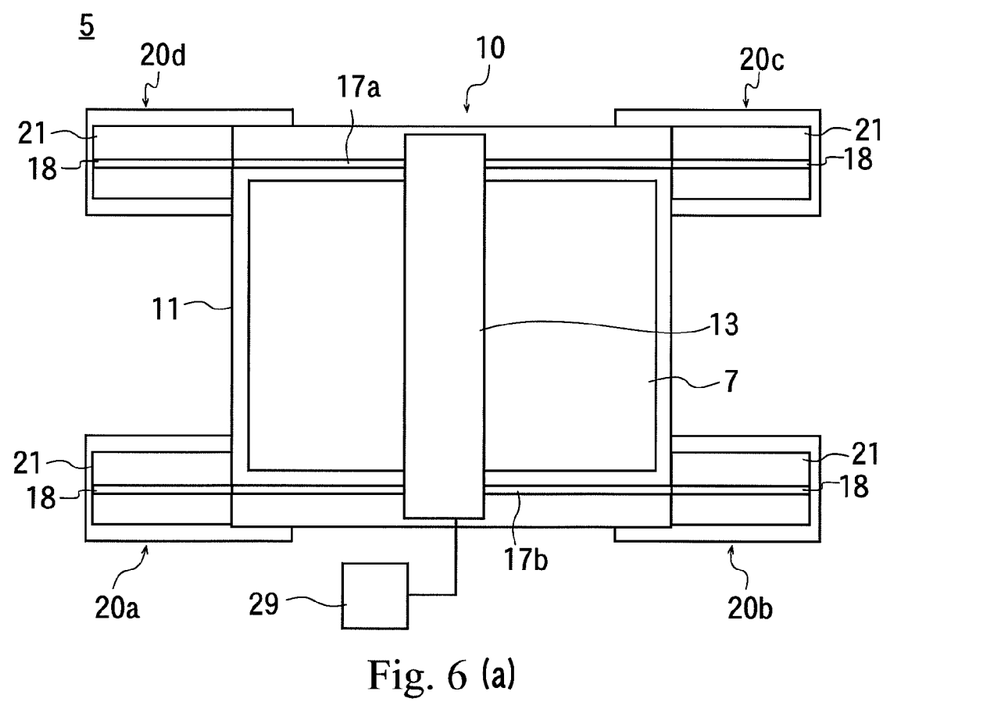
FIG. 6(a) is a plan view illustrating an operational state of the stage apparatus.
FIG. 6(b) is a side view thereof.

The stage apparatus 5 is disposed at a real installation site where ejection work onto the substrate 7 is performed. However, since the main base plate 11 is large, the main base plate 11 cannot be transported from the temporary site to the real installation site in a state, as shown in FIGS. 5 and 6, such that the sub mounting tables 20a to 20d are coupled to the main mounting table 10 and the main base plate 11 and sub base plates 21 are assembled.

The stage apparatus 5 of the present invention is arranged such that the sub mounting tables 20a to 20d are detachable with respect to the main mounting table 10, wherein, as described below, the main mounting table 10 and the sub mounting tables 20a to 20d are separated from each other after position alignment is performed at the temporary installation site, and transported from the temporary installation site to the real installation site, the state of position alignment being restored at the real installation site; and the main base plate 11 and the sub base plates 21 are connected to each other.

Figure 1:
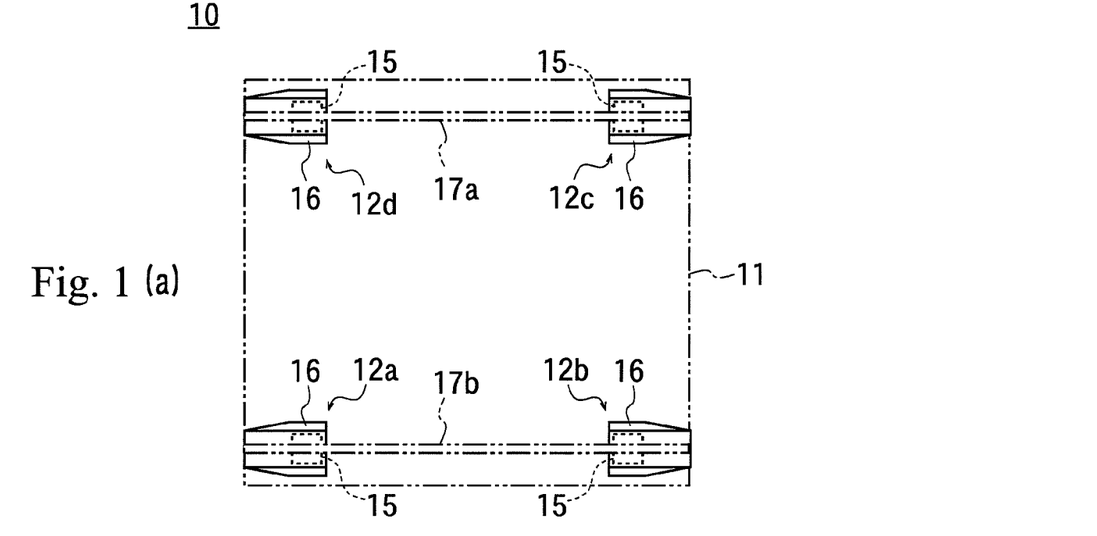
FIG. 1(a) is a plan view illustrating a main mounting table at a temporary installation site.
FIG. 1(b) is a side view thereof.

FIG. 1(a) is a plan view of the main mounting table 10 in a state of being disposed not at the real installation site but at the temporary installation site; and FIG. 1(b) is a side view of the main mounting table 10.

Leg sections 12a to 12d are disposed near the four corners of the backside surface of the main base plate 11.

In FIG. 1(a) (and in later-described FIGS. 3(a) and 4(a)), the main base plate 11 and main rails 17a and 17b are shown by chain double-dashed lines, and parts of the leg sections 12a to 12d are shown by solid lines. The leg sections 12a to 12d are fixed on the back surface of the main base plate 11.

Figure 2:
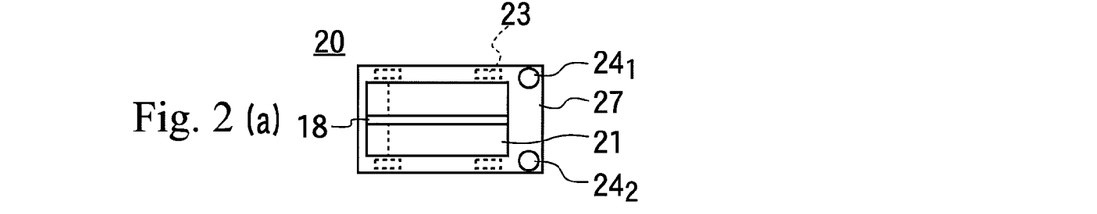
FIG. 2(a) is a plan view illustrating a sub mounting table at the temporary installation site.
FIG. 2(b) is a side view thereof.

Next, FIG. 2(a) is a plan view of the sub mounting tables 20a to 20d, and FIG. 2(b) is a side view thereof. The sub mounting tables 20a to 20d respectively have a carriage 22, and the sub base plates 21 are mounted on the respective carriages 22.

Each carriage 22 is provided with a plurality of transporting wheels 23. Here, each carriage 22 is provided with a pedestal 27; and the transporting wheels 23 are arranged at four portions of the bottom surface of the pedestal 27.

The main base plate 11 and sub base plates 21 have a rectangular or square shape. The size of the sub base plates 21 is set equal to or smaller than a half of the size of the main base plate 11. Two sub base plates 21 can be connected to each of two sides of the main base plate 11, respectively.

The transporting wheels 23 are arranged on the sub base plates 21 so as to move the sub base plates 21 at least forward and backward in a direction where the sub base plates 21 connected to the main base plate 11 are the head. When the transporting wheels 23 are grounded on the floor and a force is applied in the forward or backward direction, the transporting wheels 23 rotate and the sub mounting tables 20a to 20d run on the floor in the direction along which the force is applied.

One or plural sub positioning members $24_1$, $24_2$ formed of a roller and a rotation shaft are arranged on a pedestal 27.

Here, two sub positioning members $24_1$ and $24_2$ are arranged at a head portion of the pedestal 27 in the direction of a forward movement of the sub mounting tables 20a to 20d. The sub positioning members $24_1$ and $24_2$ are disposed separately from each other at both side of the moving direction of the pedestal 27.

Each of the leg sections 12a to 12d is in contact with the floor, and has a support section 15 for supporting the main base plate 11 and a main positioning member 16 having a plate shape provided on outer circumferential side surfaces of the support section 15. The main positioning members 16 are disposed above the floor at a constant distance from the floor, and gaps are formed between the main positioning members 16 and the floor.

The sub positioning members $24_1$ and $24_2$ are arranged so as to be movable and fixable with respect to the pedestals 27. The distance between the sub positioning members $24_1$ and $24_2$ is set in advance to be large. As the sub mounting table 20d shown in FIG. 3, the head portion of the sub mounting table 20d is directed to the leg portion 12b and is moved forward such that the main rail 17a (or 17b) and the sub rail 18 can form a straight line, the pedestal 27 being inserted between the main positioning member 16 and the floor similar to the sub mounting table 20c shown in FIG. 3.

The main positioning members 16 are disposed on the side surfaces of the leg sections 12a to 12d, which are in parallel with the main rails 17a and 17b.

Each main positioning member 16 is disposed at the same height as the sub positioning members $24_1$ and $24_2$, while the distance between the sub positioning members $24_1$ and $24_2$ is set larger than the width between the main positioning members 16. The pedestal 27 is inserted under the main positioning member 16, without the main positioning member 16 being in contact with the sub positioning members $24_1$, $24_2$. Then, the sub base plate 21 contacts the main base plate 11, as with the sub-mounting table 20b contacting the main base plate 11, as shown in FIG. 3.

In this state, the error is far from an ideal positional relationship between the main base plate 11 and the sub base plate 21.

On the sub mounting tables 20a to 20d, there are arranged adjustment mechanisms 30 which can change the heights, inclinations, horizontal position and direction of the sub base plates 21.

This adjustment mechanism 30 includes a coarse adjustment mechanism 31 capable of schematically changing the height, the inclination, and the position and direction in the horizontal plane of the sub base plate 21, and a fine adjustment mechanism 32 capable of changing more finely than with the coarse adjustment mechanism 31.

The coarse adjustment mechanism 31 is arranged so as to be able to change the height, the inclination, and the horizontal position to a larger extent as compared to if the fine adjustment mechanism 32 were used. First, in each of the sub mounting tables 20a to 20d, the coarse adjustment mechanism 31 performs schematic position alignment of the sub base plate 21 with the main base plate 11.

Assuming that the floor of the temporary installation site is horizontal and that the main base plate 11 is set such that the surface of the main base plate 11 is made horizontal in advance by a main adjustment mechanism (not shown) provided on the main mounting table 10, the sub base plates 21 are made horizontal at substantially the same height as the surface of the main base plate 11; and the relative positions and directions thereof with respect to the main base plate 11 are coarsely adjusted by the coarse adjustment mechanisms 31; and thus, schematic position alignment is performed.

Figure 3:
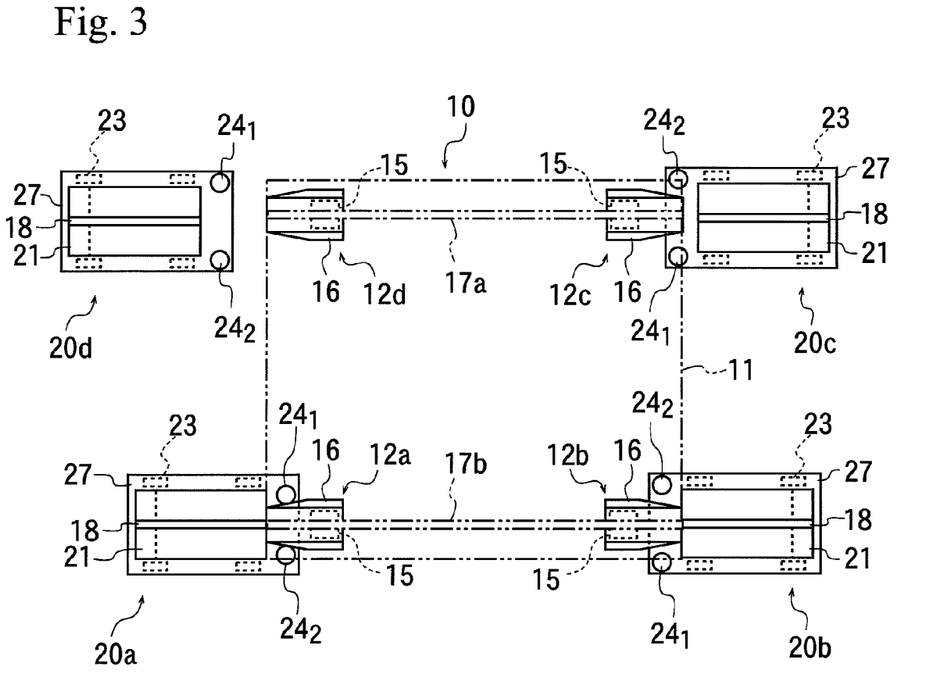
FIG. 3 is an inner plan view illustrating a procedure of coupling sub mounting tables with the main mounting table at the temporary installation site.

Next, while the coarse adjustment mechanism 31 is fixed (by the coarse adjustment screw or the like), and the coarsely adjusted relative position between the sub base plate 21 and main base plate 11 is maintained so as not to change, the sub positioning members $24_1$ and $24_2$ are moved and fixed to the pedestal 27 in a state of being in contact with the main positioning member 16, and then, the main positioning members 16 are sandwiched by the sub positioning members $24_1$ and $24_2$, respectively (the sub mounting table 20a shown in FIG. 3).

Thus, the positional relationships in a coarsely adjusted state between the main mounting table 10 and the sub mounting tables 20a to 20d are defined.

The support sections 15 are located more toward the inner side than the outer circumference of the main base plate 11; and each main positioning member 16 is formed so as to be wider at the portion that is far from the outer circumference of the base plate 11 and narrower at the portion that is near the outer circumference of the main base plate 11. In a state where the sub positioning members $24_1$ and $24_2$ sandwich the main positioning member 16, the sub mounting tables 20a to 20d can move outward (backward) from the main base plate 11 and cannot move forward or in the left-right direction with respect to the leg sections 12a to 12d.

Accordingly, unless the fixing of the coarse adjustment mechanisms 31 or the fixing of the sub positioning members $24_1$ and $24_2$ to the pedestals 27 is released, even if the sub mounting tables 20a to 20d are separated from the main mounting table 10, the coarsely adjusted state can be easily restored by moving the sub mounting tables 20a to 20d because the main positioning members 16 are sandwiched by the sub positioning members $24_1$ and $24_2$ in the same manner as before the separation.

A mount 25 is arranged between each pedestal 27 and sub base plate 21. The sub base plate 21 is fixed to the mount 25. A coupling member 33 is arranged on the mount 25. When such coupling members 33 fix the mounts 25 to the leg sections 12a to 12d, the relative positions between the main base plate 11 and the sub base plates 21 are fixed through the mounts 25 and leg sections 12a to 12d in such a state that the main base plate 11 and sub base plates 21 are coarsely adjusted relative to each other.

Next, with the fine adjustment mechanisms 32, the height, inclination, and the horizontal position and direction of the sub base plates 21 to the main base plate 11 are adjusted, thereby sub mounting tables 20a to 20d are respectively and finely adjusted.

Based on the above discussions, the positions of the sub base plates 21 and the main base plate 11 reach a state of alignment relative to each other; and the sub rails 18 are connected straight at both ends of the main rails 17a and 17b; and thus, linear rails 19a and 19b are obtained.

After performing the above-discussed preliminary assembling at the temporary installation site, when the coupling members 33 are removed, and the couplings between the main mounting table 10 and the sub mounting tables 20a to 20d are released, and the sub mounting tables 20a to 20d are moved back so that the main table 10 and the sub mounting tables 20a to 20d are separated from each other, the main table 10 and the sub mounting tables 20a to 20d can be separately transported.

In this state, the fixing of the sub positioning members $24_1$ and $24_2$ to the pedestals 27 is not released, and the distance between the positioning members $24_1$ and $24_2$ is not changed. Further, the coarse motion screws and fine motion screws of the coarse adjustment mechanisms 31 and fine adjustment mechanisms 32 are fixed so that the adjustment made by the coarse adjustment mechanisms 31 and the fine adjustment mechanisms 32 do not change.

The main mounting table 10 and sub mounting tables 20a to 20d are individually loaded on a vehicle or the like, and transported to the real installation site by land, sea, or the like, and then, the main mounting table 10 is disposed at a predetermined position of the real installation site.

Figure 7:
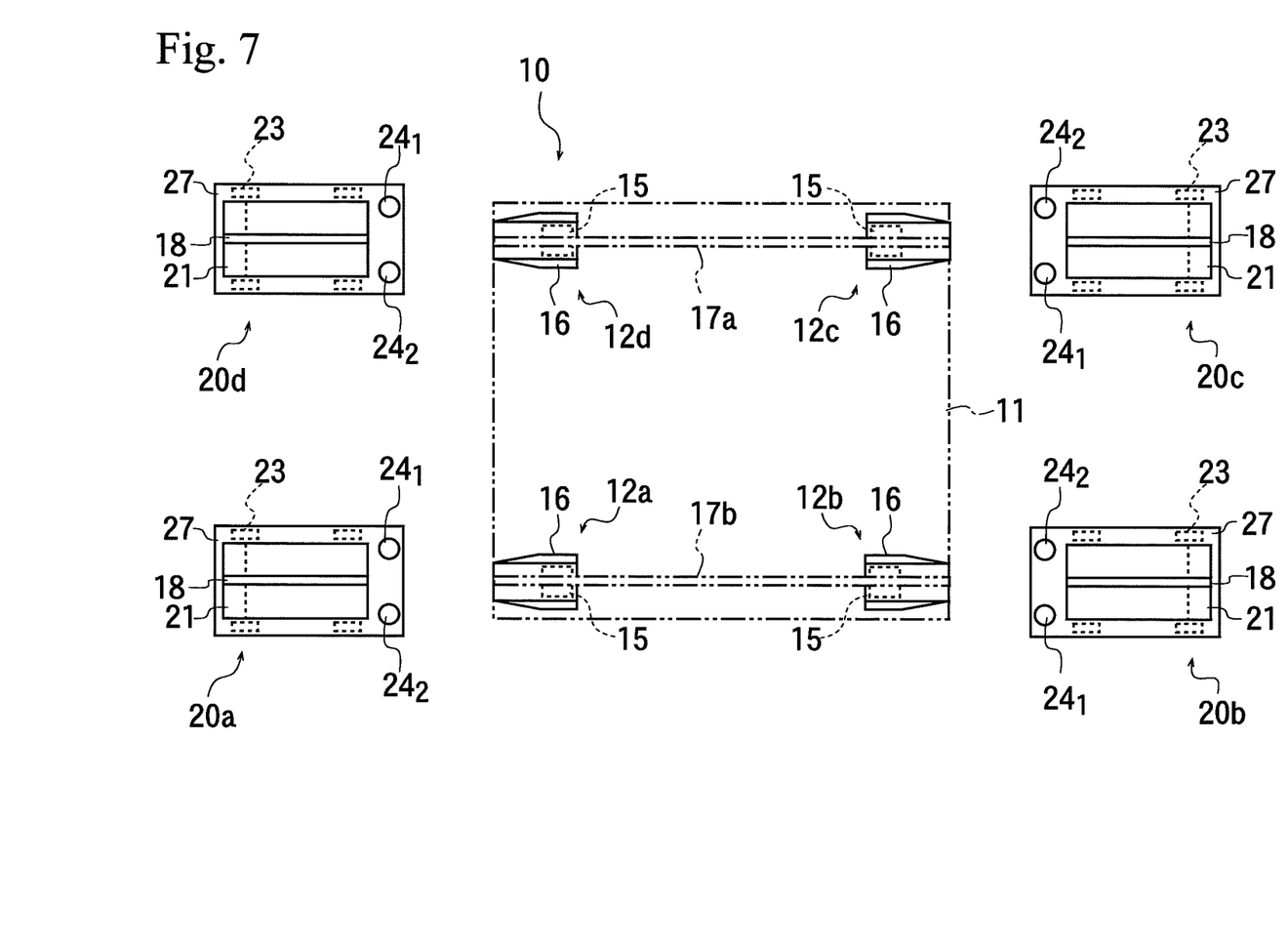
FIG. 7 is a plan view illustrating a procedure for coupling the sub mounting tables with the main mounting table at the real installation site.

Next, the sub mounting tables 20a to 20d are disposed toward the leg sections 12a to 12d, and as shown in FIG. 7, the sub mounting tables 20a to 20d are respectively moved forward toward the leg sections 12a to 12d in order that the assembly state of the sub mounting tables 20a to 20d made at the temporary installation site can be restored.

The width of the main positioning members 16 is larger toward the deeper side with respect to the moving direction of the sub mounting tables 20a to 20d. Accordingly, when the pedestals 27 of the respective sub mounting tables 20a to 20d enter below the main positioning members 16, the main positioning members 16 are inserted between the sub positioning members $24_1$ and $24_2$, and when the sub positioning members $24_1$ and $24_2$ come into contact with the main positioning members 16, the sub mounting tables 20a to 20d stop moving forward.

Figure 4:
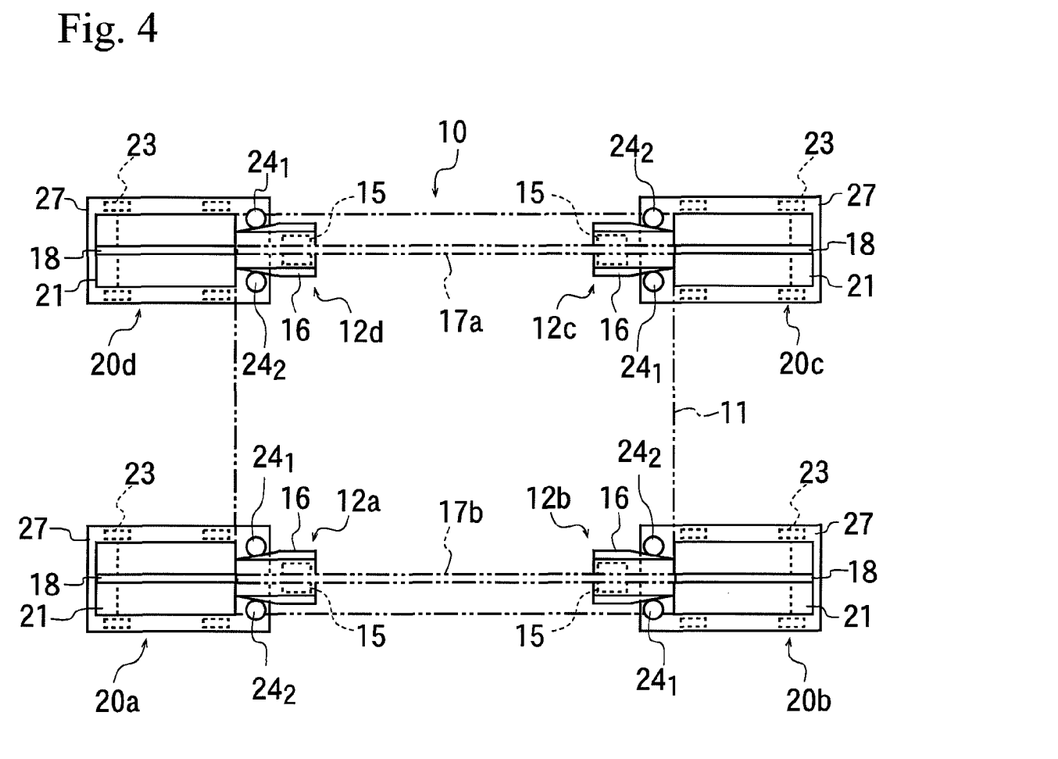
FIG. 4 is an inner plan view illustrating a state of the main mounting table and sub mounting tables coupled at the temporary installation site or a real installation site.

This state is the same as shown in FIG. 4, wherein the mounts 25 of the sub mounting tables 20a to 20d and the leg sections 12a to 12d of the main mounting table 10 are coupled and fixed by the coupling members 33 to each other, and the pedestals 27 are fixed with respect to the leg sections 12a to 12d.

When the floor of the temporary installation site and the floor of the real installation site are horizontal, and the sub positioning members $24_1$, $24_2$ and the main positioning members 16 are in contact with each other at the same positions as the positions where they were in contact with each other at the temporary installation site, the positional relationship between the sub mounting tables 20a to 20d and the main mounting table 10 at the temporary assembly site is restored.

That is, the sub base plates 21 and the main base plate 11 are in the same state as in the state when coarse adjustment and fine adjustment were performed.

However, because the coupling between the sub mounting tables 20a to 20d and the main mounting table 10 was once released and then the sub mounting tables 20a to 20d and the main mounting table 10 were separated from each other and thus transported, a small error in position alignment may have occurred due to vibration, change in temperature, or the like during transportation thereof. Furthermore, there may be an error with respect to the installation site; and even when the surface of the main base plate 11 is reset to be horizontal at the real installation site, an error in positional relationship may occur.

This error in positional alignment is comparable to a fine adjustment error, and the state that coarse adjustment has made is maintained. Consequently, even when readjustment is made, adjustment can be quickly performed with a small amount of adjustment.

Accordingly, after the surface of the main base plate 11 is made horizontal, when the vertical heights and inclinations and the horizontal positions and directions of the sub mounting tables 20a to 20d are finely adjusted with the fine adjustment mechanisms 32, the positions of the sub base plates 21 with respect to the main base plate 11 are changed, the position alignment error $E_4$ becomes small, and the position alignment error between the main base plate 11 and the sub base plates 21 can be made comparable to the fine adjustment error $E_3$ which occurred before the transportation.

FIGS. 5(a) and 5(b) are a plan view and a side view of the stage apparatus 5 assembled at the real installation site by the forgoing procedure, wherein the main rails 17a and 17b on the main base plate 11 and the sub rails 18 on the sub base plates 21 are lineally connected, and thus the rails 19a and 19b are arranged so as to be straight.

In the figures, the ejection device 13 is located on the sub mounting tables 20b and 20c which are disposed outside the main mounting table 10. This location enables cleaning of the print head or the like. Further, since the ejection device 13 is not on a substrate, it is possible to replace a substrate 7 on the main mounting table 10.

As the accuracy of position alignment between the main base plate 11 and the sub base plates 21 is high, even when the ejection device 13 is moved on and between the sub mounting tables 20a to 20d and the main mounting table 10, as shown in FIGS. 6 (a) and 6(b), vibration does not occur.

The mounts 25 are separable from the carriages 22. When the mounts 25 are fixed to the leg sections 12a to 12d by the coupling members 33, even if the carriages 22 are removed from under the mounts 25 as shown in FIG. 6(b), the sub base plates 21 are in a state of being fixed to the main base plate 11.

Discussed above is the present invention prior to the assembling of the sub mounting tables 20a to 20d and the main mounting table 10 at the real installation site. For example, the positions of the sub base plates 21 and the main base plate 11 are aligned with each other at the temporary installation site in the factory where the stage apparatus 5 is fabricated. The sub base plates 21 and the main base plate 11 are separated from each other so as to be restored, and transported. Thereby, assembly thereof at the real installation site is made possible.

Incidentally, the coupling members 33 to be used for assembly may be arranged on the sub mounting tables 20a to 20d, or may be arranged on the main mounting table 10. Further, the coupling members 33 may be arranged so as to be removable from both the sub mounting tables 20a to 20d and the main mounting table 10.

In the foregoing embodiments, the main positioning members 16 are formed of plate-shaped members, and the sub positioning members $24_1$ and $24_2$ are formed of rollers in contact with the side surfaces of the main positioning members 16. However, the main positioning members 16 and the sub positioning members $24_1$ and $24_2$ are not limited thereto, and can be any types of members that reproduce the relative positional relationship between the sub base plates 21 and the main base plate 11. The main positioning members may be formed of rolls, and the sub positioning members may be formed of plate-shaped members.

Further, in the forgoing embodiments, the main positioning members 16 are fixed inside the leg sections 12a to 12d, the positional relationship between the main positioning members 16 and the main base plate 11 is fixed, and the sub positioning members $24_1$ and $24_2$ are arranged movable and fixable with respect to the pedestals 27. However, in reverse, the positional relationship between the sub positioning members $24_1$ and $24_2$ and the sub base plate 21 may be fixed, and the relative positions between the main positioning members 16 and the main base plate 11 may be arranged so as to be changeable and fixable. In this case, after fixing by the coupling members 33 to follow coarse adjustment, the main positioning members 16 may be moved so as to be in contact with the sub positioning members $24_1$ and $24_2$, and the positions of the main positioning members 16 with respect to the main base plate 11 may be fixed.

Figure 8:
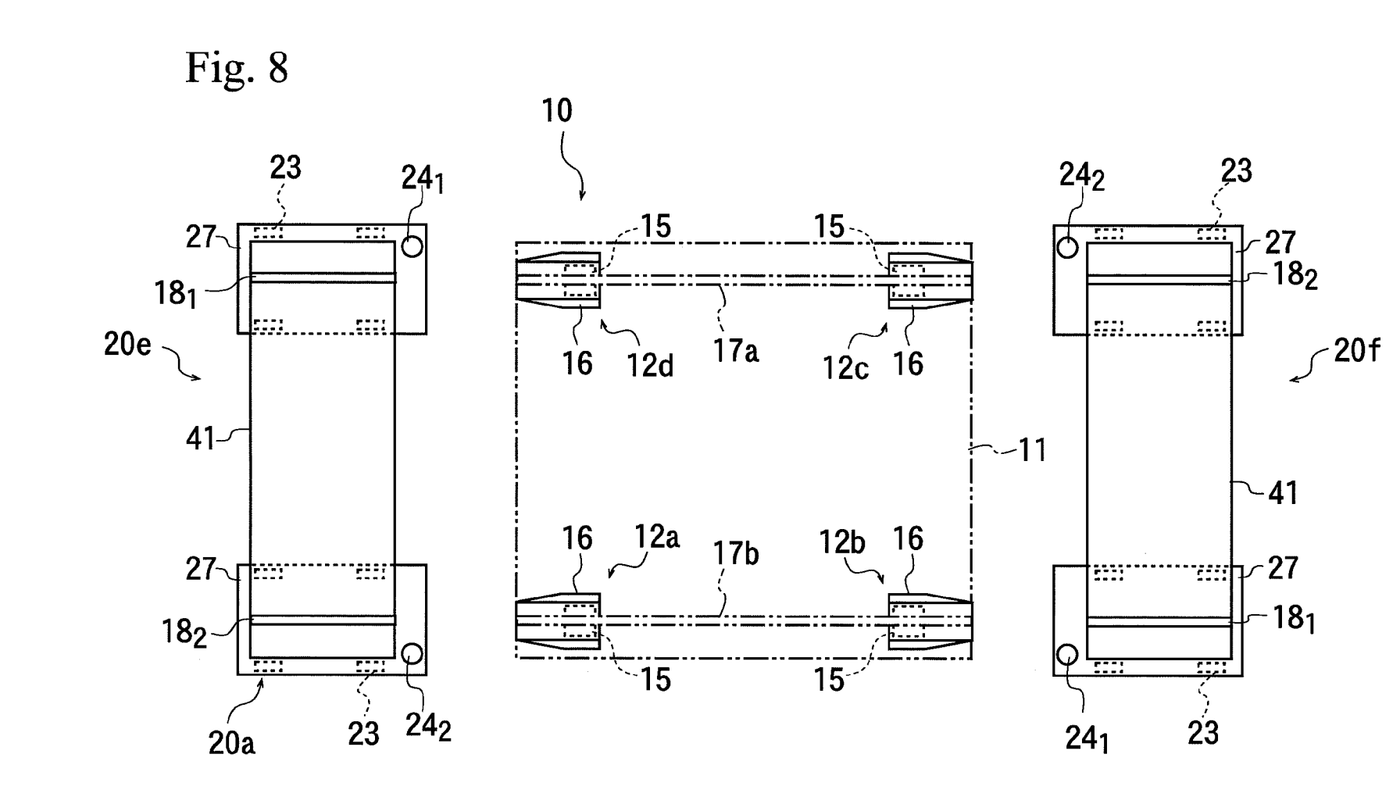
FIG. 8 is a plan view illustrating another example of a stage apparatus of the present invention.

Furthermore, in the foregoing embodiments, the four sub mounting tables 20a to 20d having respective sub base plates 21 are coupled with the four leg sections 12a to 12d one by one. However, as shown in FIG. 8, the present invention also includes a stage apparatus that is assembled with sub mounting tables 20e and 20f having a wide sub base plate 41 provided with two sub rails $18_1$ and $18_2$, and a main mounting table 10 of which the sub mounting tables 20e and 20f are coupled to respective two of the leg sections 12a to 12d of the main mounting table 10.

Also in this case, the sub base plates 41 of the sub mounting tables 20e, 20f and the main base plate 11 of the main mounting table 10 are subjected to position alignment by adjustment mechanisms 30 at the temporary installation site in advance, separated from each other such that this state is maintained, and then transported. Thereafter, the position alignment can be restored at the real installation site. Fine adjustment may be made by adjustment mechanisms 30 at the real installation site.

Further, in the foregoing embodiments, the ejection device 13 is disposed on the main and sub mounting tables 10 and 20a to 20d of the stage apparatus 5 in accordance with the present invention to be used as an inkjet apparatus. However, the present invention is not limited thereto. A laser irradiation device may be disposed on the stage apparatus 5 in accordance with the invention to be used as a heating device, inspection device, or an exposure device, and alternatively, a substrate position alignment device may be used as an aligner.

In short, the stage apparatus 5 of the present invention is not limited to an inkjet apparatus.

Further, a movable member movable on the rails 19a and 19b is not limited to a gantry, and may be a mounting table to mount an object to be processed (such as, e.g., a substrate).

What is claimed is:
1. A stage apparatus, comprising:
a main mounting table having a main base plate, wherein the main base plate is disposed at a top of the main mounting table; and
a sub mounting table having a sub base plate, wherein the sub base plate is disposed at a top of the sub mounting table and is smaller than the main base plate,
a main rail arranged on the main base plate of the main mounting table; and
a sub rail, which is coupled to the main rail, disposed on the sub base plate of the sub mounting table,
wherein the main base plate and sub base plate are detachably connected to each other, and surfaces of the main base plate and sub base plate are flat, and the surfaces of the main base plate and the sub base plate are disposed so as to be horizontal at the same height,
wherein, on a rail of which the main rail and the sub rail are connected, a gantry is arranged or a movable mounting table of which an object to be processed is arranged thereon is provided,
wherein the sub mounting table includes:
a carriage having the sub base plate mounted thereon, wherein the carriage is provided with a plurality of transporting wheels, and
an adjustment mechanism that changes a relative position between the carriage and the sub base plate.
2. The stage apparatus of claim 1, further comprising:
a main positioning member arranged at the main mounting table; and a sub positioning member, which can be in contact with the main positioning member, arranged at the sub mounting table, wherein for a positional relationship between the main positioning member and main base plate and a positional relationship between the sub positioning member and sub base plate, at least one positional relationship is changeable and fixable.

3. The stage apparatus of claim 2, wherein the main positioning member and sub positioning member fit with each other so as to define a position of the sub mounting table with respect to the main mounting table.

4. The stage apparatus of claim 2, wherein the sub positioning member is disposed on the carriage.

* * * * *